J. JESSEN.
TRANSMISSION MECHANISM.
APPLICATION FILED OCT. 5, 1917. RENEWED MAY 1, 1920.

1,371,376.

Patented Mar. 15, 1921.
3 SHEETS—SHEET 1.

WITNESSES

INVENTOR.
JAMES JESSEN
BY
ATTORNEYS.

UNITED STATES PATENT OFFICE.

JAMES JESSEN, OF MILWAUKEE, WISCONSIN, ASSIGNOR, BY MESNE ASSIGNMENTS, TO INDUSTRIAL RESEARCH CORPORATION, A CORPORATION OF DELAWARE.

TRANSMISSION MECHANISM.

1,371,376.      Specification of Letters Patent.      Patented Mar. 15, 1921.

Application filed October 5, 1917, Serial No. 194,896. Renewed May 1, 1920. Serial No. 378,717.

*To all whom it may concern:*

Be it known that I, JAMES JESSEN, a citizen of the United States, and resident of Milwaukee, in the county of Milwaukee and State of Wisconsin, have invented new and useful Improvements in Transmission Mechanism, of which the following is a description, reference being had to the accompanying drawings, which are a part of this specification.

The invention relates to transmission mechanism.

The object of the invention is to provide a simple, compact and reversible power transmission mechanism and a variable speed transmission to the driven shaft and to a pulley or other power transmitting member.

A further object of the invention is to provide a simple, compact gear shifting mechanism that can be easily and positively operated so that only one set of gears can be in mesh at a time to prevent damage or injury.

While in this application I have shown a plain driven shaft, the device is primarily designed for use in connection with a tractor in which said driven shaft is connected up to the tractor wheels as shown in my application Serial No. 202,125 filed Nov. 15, 1917.

The invention further consists in the several features hereinafter set forth.

Figure 1:
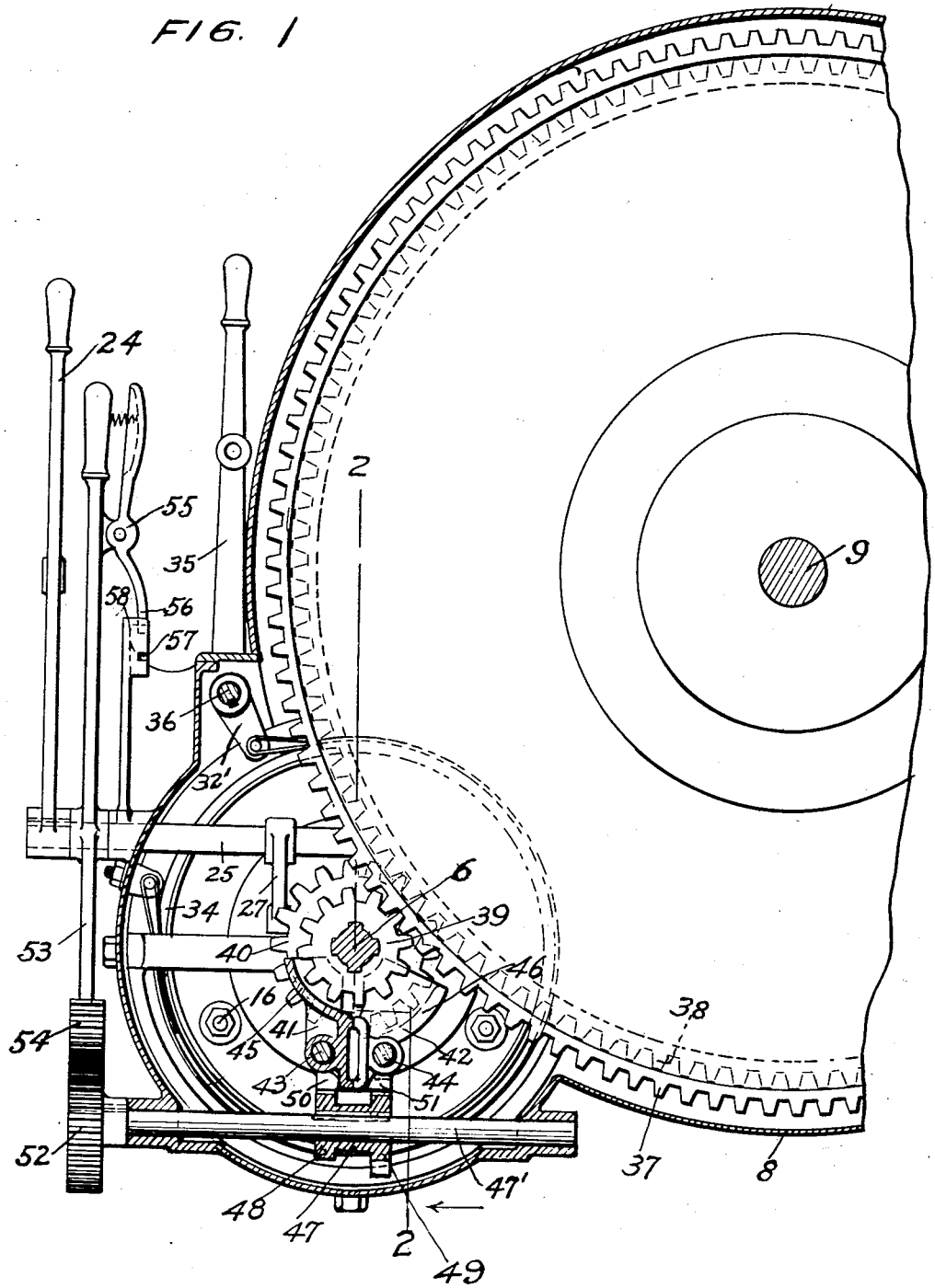
Figure 1 is a vertical sectional view through the transmission mechanism taken on the line 1—1 of Fig. 2; parts being broken away.
Figure 2:
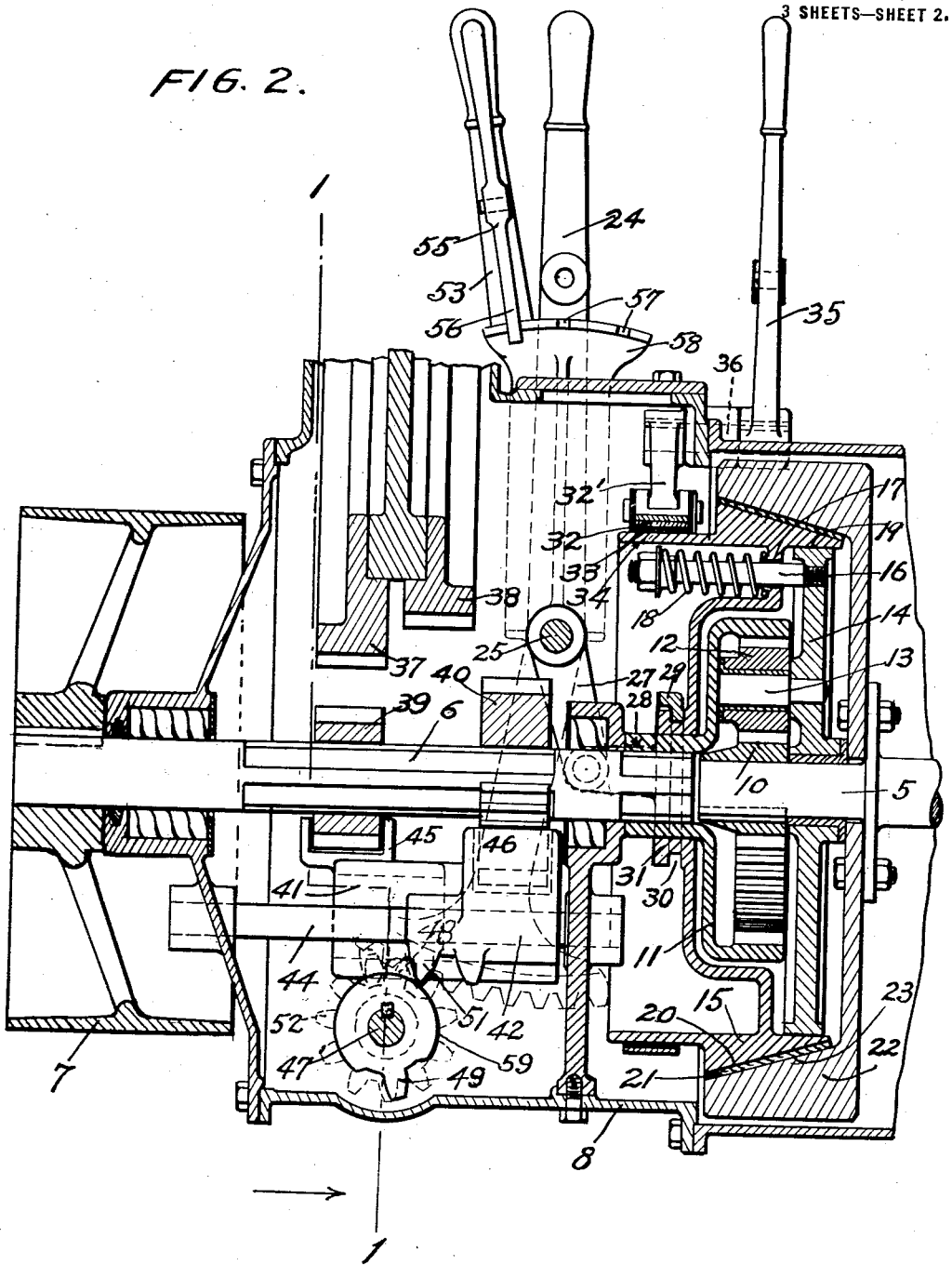
Fig. 2 is a section taken on the line 2—2 of Fig. 1, parts being broken away.
Figure 3:
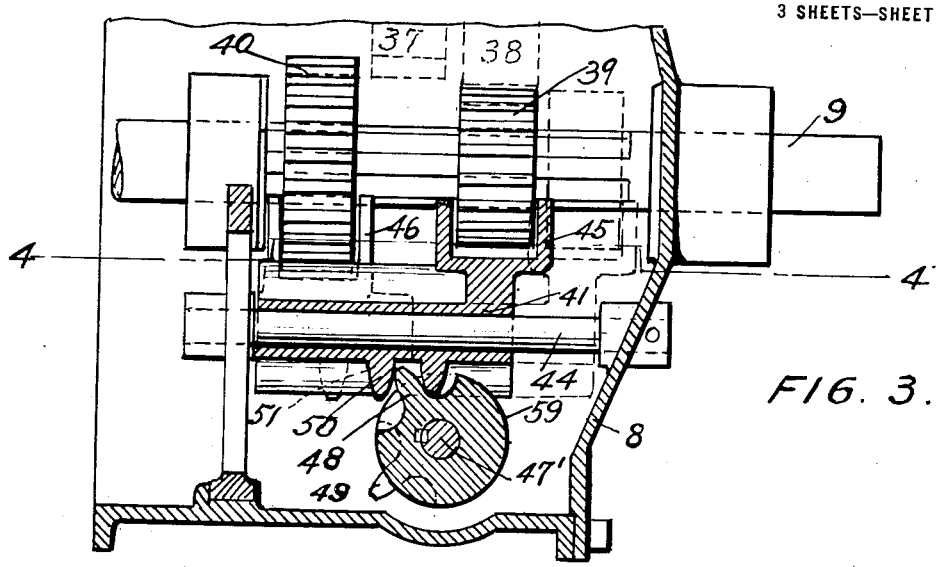
Fig. 3 is a detail sectional view through the gear shifting mechanism taken on the line 3—3 of Fig. 4.
Figure 4:
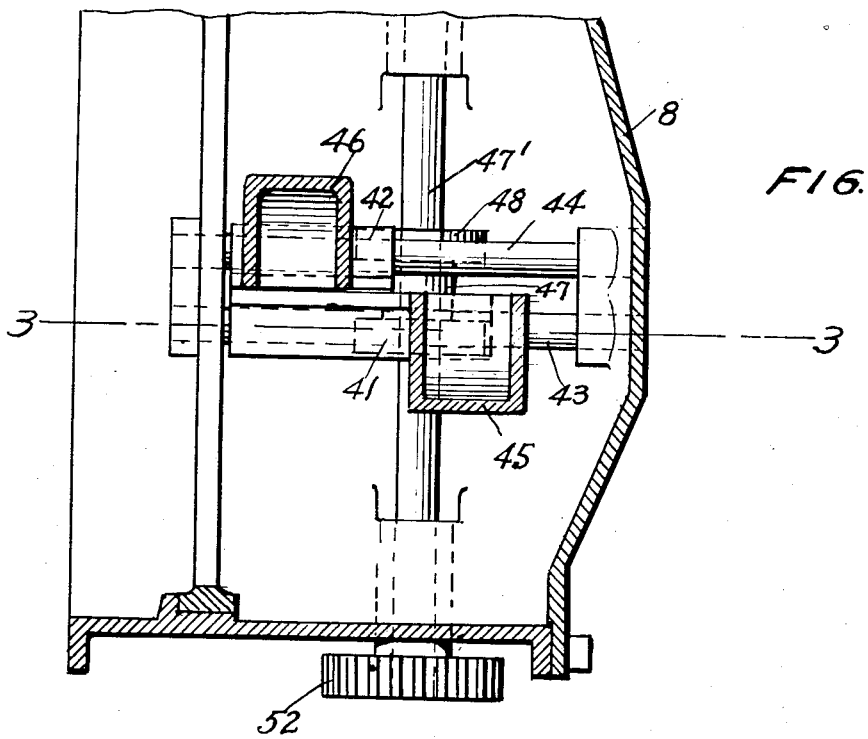
Fig. 4 is a sectional view taken on the line 4—4 of Fig. 3.

In the drawings the numeral 5 designates the engine shaft or drive shaft, 6 the driven shaft carrying a drive pulley 7, 8 the casing as a whole, and 9 the shaft to be driven at variable speeds, Figs. 1 and 2.

The shaft 6 is connected up to the drive shaft 5 for forward and reverse drive in the following manner. A sun gear 10 is mounted on the shaft 5, an orbit gear 11 on the shaft 6 and a plurality of planetary gears 12 (only one being shown) meshing with said sun and orbit gears are journaled on stud shafts 13 carried by a disk 14 revolubly mounted upon the shaft 5. The disk 14 is yieldingly connected to a movable drum 15 by means of studs 16 (only one being shown) secured to the disk 14 and passing through apertures 17 in the drum 15 and carrying coiled springs 18 which press against the sides of the drum, the disk being slidably mounted in an annular recess 19 in the drum 15. The drum 15 is provided with a conical face 20 having a friction facing 21 which is adapted to contact with a drum 22 carried by the shaft 5 and having an annular conical clutch face 23 adapted to frictionally engage the facing 21 to form a frictional clutch. The drum 15 is adapted to be moved out of frictional engagement with the drum 22 by means of a lever 24 secured to a shaft 25 journaled in the casing 8 and carrying a crank 27 to which a forked link 28 is pivotally connected, the bifurcations 29 (only one being shown) of said link engaging in an annular recess 30 in the hub 31 of the drum 15. With this construction the springs 18 normally hold the drum 15 in frictional engagement with the drum 22 but on a shifting of the lever 24 in the proper direction, the drum 15 will, through the movement of the shaft 25, crank 27 and link 28, be moved out of frictional engagement with the drum 22 against the action of springs 18. Means are also provided for holding the drum 15 against movement when it has been moved out of engagement with the drum 22 comprising a brake band 32 secured at one end to the casing 14 and at the other to a crank 32' and provided with a brake lining 33 which is adapted to be brought into contact with the brake wheel portion 34 of the drum 15 by turning the crank 32' through a lever 35 and shaft 36 to which said crank is secured.

With this construction when the friction clutch is in, that is when the drums 15 and 22 are in frictional engagement with each other, the disk 14 being non-rotatably secured to the drum 15 will be rotated with the shaft 5, and the drive for the shaft 6 will be locked through the gears 10, 12 and 11 to turn said shaft 6 in the same direction as the shaft 5. When the drums 15 and 22 are thrown out of engagement with each other by the shifting of the lever 24 and securing the drum 15 against rotation through the application of the brake in the manner previously described, then the disk 14 will also be held against rotation and the drive for the shaft 6 will be from the gear 10 through the idler gears 12 to the gear 11. This will result in reverse drive of the shaft 6 from that of the shaft 5 and at a slower rate of speed.

The shaft 9 is driven at speeds varying from the speed of the shaft 6 through a variable speed transmission now to be described. This consists of a large gear 37 for low speed and a smaller gear 38 for high speed mounted on the shaft 9 and gears 39 and 40 slidably but non-rotatably mounted upon the shaft 6 and adapted to be respectively brought into driving connection with the gear 37 and the gear 38.

The means for shifting the gears 39 and 40 comprises members 41 and 42 slidably mounted respectively on spaced apart shafts 43 and 44 and provided with gear engaging forked portions 45 and 46, and means for shifting the members 41 and 42. This means comprises a member 47 mounted on a shaft 47' and carrying "Geneva" toothed gears 48 and 49 meshing respectively with toothed projections 50 and 51 on the members 41 and 42, and means for turning the shaft 47', here shown as consisting of a gear 52 on said shaft, a lever 53 pivotally mounted on the shaft 25 and provided with a segmental gear 54 meshing with the gear 52. said lever being secured in different positions of adjustment by means of a spring pressed locking lever 55, the end 56 of which is adapted to engage in recesses 57 in a locking segment 58. It will be noted that the tooth on the gear 48 and that on the gear 49 are spaced apart for relative movement of the members with respect to each and that both of the gears have a cylindrical surface 59 against which the inner projections 50 or 51 contact when the tooth of the gears 48 and 49 are not in mesh with projections 50 or 51 with the result that the members 41 or 42 are held against movement, forming what is called a "Geneva stop."

With this construction when the lever 53 is moved to the position shown in Fig. 2, the shaft 47' is turned to bring the tooth of the gear 48 into mesh with the tooth formed by the projections 50 and the member 41 together with its forked portion 45 is shifted to bring the gear 39 into mesh with the gear 37 to drive the shaft 9 at low speed. When the lever is moved to neutral position both gears 39 and 40 will be thrown out. When the lever 53 is shifted back past neutral and in the opposite direction, the shaft 47' is turned in the opposite direction to bring the tooth of the gear 49 into mesh with the tooth formed by the projections 51 and the member 42 together with its forked portion 46 is shifted to bring the gear 40 into mesh with the gear 38 to drive the shaft 9 at high speed. Since the tooth in the gear 49 is spaced from that of the gear 48 the gear 39 will be thrown out of engagement with the gear 38 before the gear 40 moves into engagement with the gear 37 and vice versa. And furthermore while one of the gears is being moved the "Geneva stop" arrangement holds the other sliding member from movement. Thus by reversing the position of the lever 53 on either side of its normal position the shaft 9 may be driven at high or low speed.

With the gears 39 and 40 in neutral position the shaft 6 may be connected up to the shaft 5 to drive the pulley 7 to furnish power for other machinery.

What I claim as my invention is:

1. In a transmission mechanism, the combination with a shaft provided with a gear, of a second shaft provided with a gear slidably mounted thereon and adapted to mesh with the gear of said first mentioned shaft, and means for shifting said slidable gear including a gear engaging slidable member, an oscillatory shaft, and a Geneva gear connection between said oscillatory shaft and said slidable member for shifting the gear on the second shaft into driving engagement with the gear on the first mentioned shaft.

2. In a transmission mechanism, the combination, with a shaft provided with a high speed gear and a low speed gear, of a second shaft provided with gears slidably mounted thereon and adapted to mesh respectively with said high and low speed gears, and means for shifting said slidable gears comprising gear engaging slidable members, an oscillating shaft, and Geneva gear connections between said oscillatory shaft and each of said slidable members for alternately positively shifting said slidable gears on the second shaft into driving engagement with the gears on the first named shaft.

3. In a transmission mechanism, the combination, with a shaft provided with a high speed gear and a low speed gear, of a second shaft provided with gears slidably mounted thereon and adapted to mesh respectively with said high and low speed gears, and means for shifting said slidable gears comprising independently slidable members having gear engaging portions and toothed projections, an oscillatory shaft, a member mounted on said oscillatory shaft and provided with gears having diametrically opposite single teeth for alternately respectively engaging the toothed projections in said slidable members to alternately shift said slidable gears on the second shaft into driving engagement with the gears on the first named shaft.

4. In a transmission mechanism, the combination, with a shaft provided with a high speed gear and a low speed gear, of a second shaft provided with gears slidably mounted thereon and adapted to mesh respectively with said high and low speed gears, and means for shifting said slidable gears comprising independently slidable members having gear engaging portions, an oscillatory shaft, gearing connections between said oscillatory shaft and said slidable members for alternately shifting said gears on the second shaft into driving engagement with the gears on the first named shaft, a pivoted lever, and a gearing connection between said lever and said oscillatory shaft.

5. In a transmission mechanism, the combination, with a shaft, of gears slidably mounted thereon, gear shifting members, an operating shaft, and intermittent self-locking gearing connections between said shaft and said gear shifting members whereby one of the gears is shifted to operative position while the other is held against movement and the movement of said gearing shifting members is positive.

In testimony whereof, I affix my signature.

JAMES JESSEN.